United States Patent

Sakai

Patent Number: 5,577,270
Date of Patent: Nov. 19, 1996

[54] RECEIVER FOR ELIMINATING A CROSSTALK OF AN ADJACENT BROADCAST

[75] Inventor: Yuji Sakai, Kanagawa, Japan

[73] Assignee: Sony Corporation, Tokyo, Japan

[21] Appl. No.: 515,575

[22] Filed: Aug. 16, 1995

Related U.S. Application Data

[63] Continuation of Ser. No. 240,963, May 10, 1994, abandoned, which is a continuation of Ser. No. 897,848, Jun. 12, 1992, abandoned.

[30] Foreign Application Priority Data

Jun. 21, 1991  [JP]  Japan ................................. 3-150522

[51] Int. Cl.[6] ............................. H04N 5/44; H04B 1/16
[52] U.S. Cl. ..................... 455/180.1; 455/286; 455/307; 348/736
[58] Field of Search ............................. 455/180.1, 200.1, 455/266, 286, 295, 296, 307, 314, 191.1, 191.2, 191.3; 348/729, 736

[56] References Cited

U.S. PATENT DOCUMENTS

| | | | |
|---|---|---|---|
| 4,287,602 | 9/1981 | Kessler | 455/307 |
| 4,660,087 | 4/1987 | Rumreich | 358/197 |
| 5,034,994 | 7/1991 | Muterspaugh et al. | 455/307 |
| 5,126,848 | 6/1992 | Sim | 358/188 |
| 5,146,338 | 9/1992 | Lehmann et al. | 455/180.1 |

Primary Examiner—Reinhard J. Eisenzopf
Assistant Examiner—Thanh Le
Attorney, Agent, or Firm—Jay H. Maioli

[57] ABSTRACT

A receiver has a tuner for converting a radio frequency (RF) signal of a television broadcast supplied thereto into an intermediate frequency (IF) signal, an IF circuit for amplifying the IF signal to obtain an amplified IF signal with a required band width, and a detecting circuit for detecting the IF signal supplied from the IF circuit to deliver a video signal and an audio signal. The receiver further has a trapping circuit formed in the IF circuit for trapping an interfering signal which is formed by converting, by the tuner, an RF signal of a frequency modulation (FM) broadcast whose frequency is adjacent to that of an RF signal of a television broadcast. The trapping circuit is set in an on state only when the television broadcast which RF signal frequency is adjacent to the frequency of the RF signal of the FM broadcast is selected, and the trapping circuit is set in an off state when a television broadcast other than the television broadcast is selected.

2 Claims, 6 Drawing Sheets

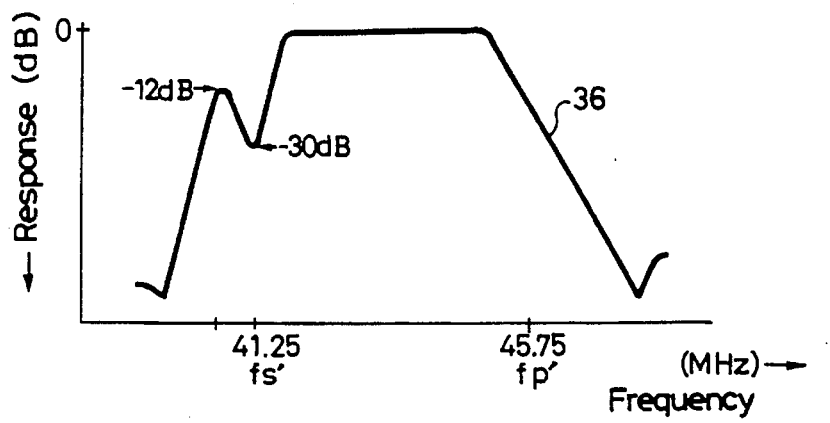
F I G. 5A
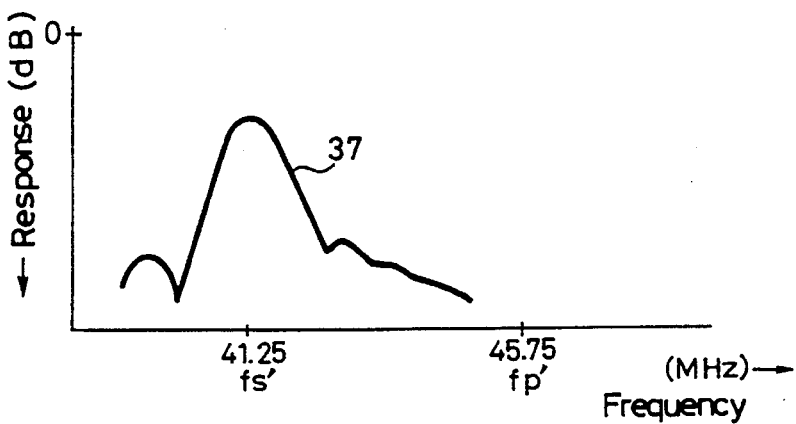
F I G. 5B
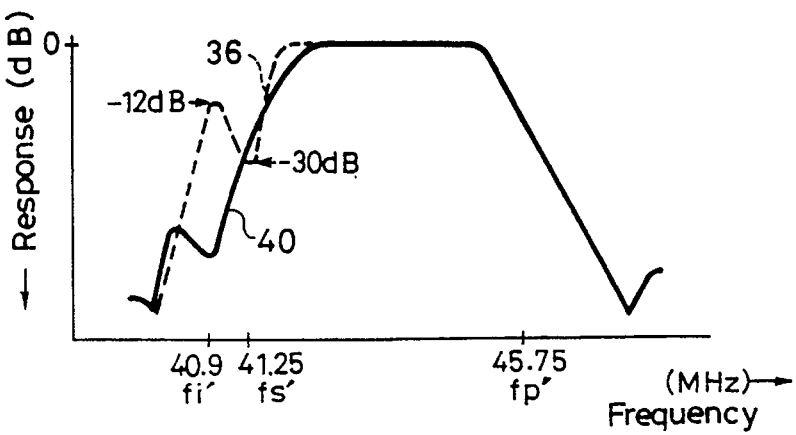
F I G. 5C

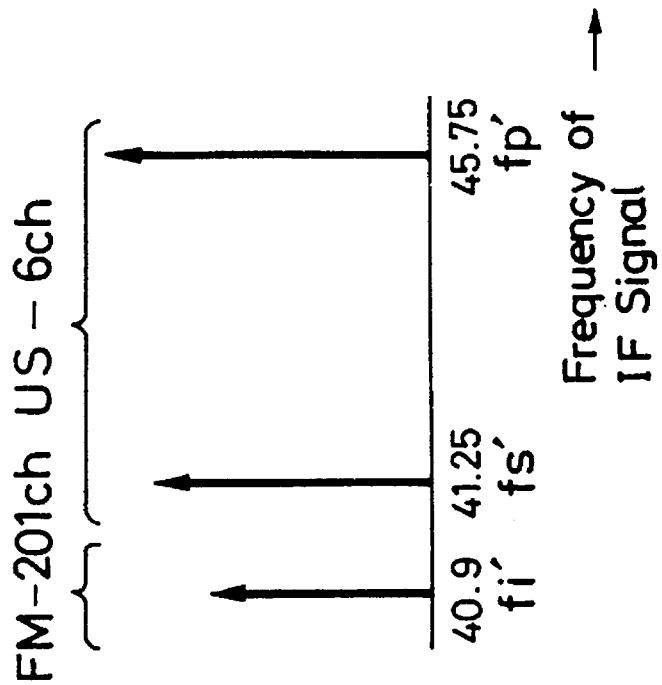
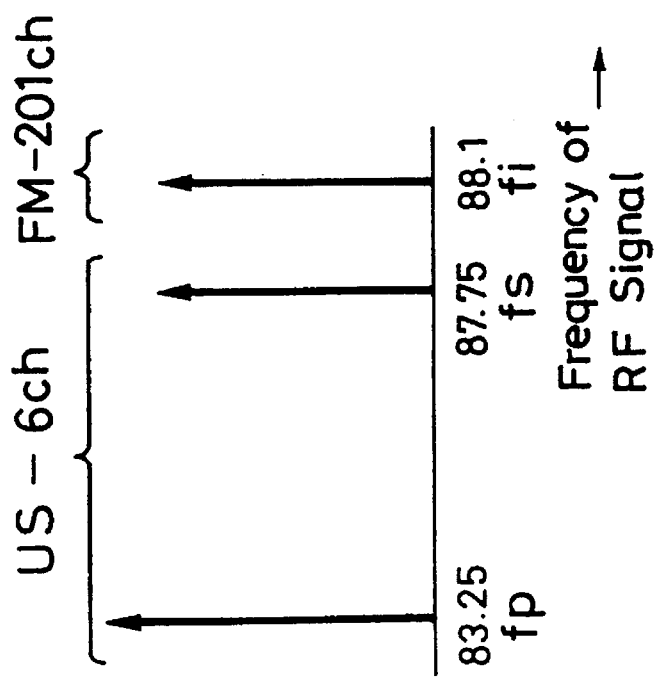

RECEIVER FOR ELIMINATING A CROSSTALK OF AN ADJACENT BROADCAST

This is a continuation of application Ser. No. 08/240,963 filed May 10, 1994, abandoned, which is a continuation of application Ser. No. 07/897,848 filed Jun. 12, 1992, abandoned.

BACKGROUND OF THE INVENTION

1. Field of the Invention

The present invention generally relates to receivers and, more particularly, is directed to a receiver for eliminating a crosstalk of an adjacent broadcast which is suitable to be applied to a television receiver used in the United States of America (U.S.A.).

2. Description of the Prior Art

FIG. 1A of the accompanying drawings shows a schematic diagram illustrating a frequency arrangement or spectrum of radio frequency (RF) signals used in the United States.

Referring to FIG. 1A, there are shown RF signals of U.S.A.-6 channel (US-6ch) of a television broadcast and RF signals of FM channels (FM-201 channel (FM-201ch) to FM-220 channel (FM-220ch)) of frequency modulation (FM) broadcasts. The FM broadcasts are arranged with a frequency distance of 200 kHz unit basis. In FIG. 1A, fp=83.25 MHz represents a video RF frequency and fs=87.75 MHz represents an audio RF frequency.

FIG. 2 of the accompanying drawings shows a block diagram illustrating an example of a conventional tuner 14 for a television receiver for receiving television broadcasts in the United States.

Referring to FIG. 2, an RF signal 2 supplied to an input terminal 1 is then applied to a mixer 8 through a bandpass filter (BPF) 3 for a very high frequency (VHF) entries, an FM trapping circuit 4, an automatic gain controller circuit 5, and an interstage circuit 6, thereby being converted into an intermediate frequency (IF) signal 9. The mixer 8 is connected with a local oscillator 7. The IF signal 9 is amplified by an amplifier 10 and then applied to an output terminal 12 as an amplified IF signal 11. An image IF frequency and an audio IF frequency of each of the IF signals 9 and 11 are 45.75 MHz and 41.25 MHz, respectively.

The FM trapping circuit 4 is provided for preventing the interference or crosstalk in the television signal by the FM broadcast upon receiving the television broadcast. The FM trapping circuit 4 has a FM trapping or selectivity characteristic shown in FIG. 1B, wherein a selectivity curve 15 is set to have a low quality factor (Q) in order to cover all FM channels of the FM-201ch to FM-220ch. Further, the selectivity curve 15 represents a maximum attenuation of about 10 to 15 dB almost at a center frequency band of the FM channels and an attenuation of about 2 to 3 dB at both ends of the FM channels, that is, at a frequency band of the FM-201ch, for example.

However, since the selectivity curve has a low Q, the interference or crosstalk due to the FM channels such as the FM-202ch, FM-203ch etc. having a higher RF frequency than the FM-201ch can be prevented, but the interference or crosstalk due to the FM-201ch adjacent to the RF signal of the television broadcast can not be prevented. Thus, there was a problem that the video and audio signals of the US-6ch having an interfering component appear at a detected output terminal 38 (FIG. 3). The interfering signal included in the IF signals 9 and 11 of the FM-201ch has a frequency fi' of 40.9 MHz.

FIG. 3 of the accompanying drawings shows a block diagram illustrating an example of a conventional television receiver. As shown in FIG. 3, in order to effectively prevent the crosstalk due to the FM-201ch, a trapping circuit 13 for trapping the interfering signal of 40.9 MHz included in the IF signals 9 and 11 of the FM-201ch is provided in an IF circuit 17 arranged between the tuner 14 and a detecting circuit 16. A surface-acoustic-wave (SAW) filter 18 with a wide pass band and an IF amplifier 19 are inserted in the IF circuit 17 between the trapping circuit 13 and the detecting circuit 16.

In the television receiver shown in FIG. 3, however, since the trapping circuit 13 is fixedly arranged in the receiver, the wide pass band of the SAW filter 18 is narrowed due to the subsidiary function, that is, attenuation function of the trapping circuit 13. Thus, the conventional television receiver has the disadvantage that all channels of the television broadcasts including the US-6ch can not be detected.

OBJECTS AND SUMMARY OF THE INVENTION

Accordingly, it is an object of the present invention to provide an improved receiver for receiving television broadcasts in which the aforementioned shortcomings and disadvantages encountered with the prior art can be eliminated.

More specifically, it is an object of the present invention to provide a receiver for receiving television broadcasts which can eliminate the crosstalk in an RF signal of a television broadcast due to an RF signal of an FM broadcast which frequency is adjacent to the RF signal of the television broadcast, and can detect RF signals of all channels of television broadcasts other than this television broadcast.

As an aspect of the present invention, there is provided a receiver having a tuner for converting an RF signal of a television broadcast supplied thereto into an IF signal, an IF circuit for amplifying the IF signal to obtain an amplified IF signal with a required band width, and a detecting circuit for detecting the IF signal supplied from the IF circuit to deliver a video signal and an audio signal, the receiver is comprises a trapping circuit formed in the IF circuit for trapping an interfering signal which is formed by converting, by the tuner, an RF signal of an FM broadcast whose frequency is adjacent to that of an RF signal of a television broadcast, and a unit for setting the trapping circuit in an on-state only when the television broadcast which RF signal frequency is adjacent to the frequency of the RF signal of the FM broadcast is selected, and for setting the trapping circuit in an off-state when a television broadcast other than the television broadcast is selected.

According to the thus constituted receiver of the present invention, since the trapping circuit is formed in the IF circuit so as to trap an interfering signal which is formed by converting, by the tuner, an RF signal of an FM broadcast whose frequency is adjacent to that of an RF signal of a television broadcast, and the trapping circuit is set in an on-state only when the television broadcast which RF signal frequency is adjacent to the frequency of the RF signal of the FM broadcast is selected, and set in an off-state when a television broadcast other than the television broadcast is selected, it is possible to eliminate the interference or crosstalk of the FM broadcast as to the television broadcast which frequency is adjacent to that of the FM broadcast, and a wide band detection can be performed as to the television broadcasts other than this television broadcast.

The preceding and other objects, features, and advantages of the present invention will become apparent from the following detailed description of an illustrative embodiment thereof when read in conjunction with the accompanying drawings.

BRIEF DESCRIPTION OF THE DRAWINGS

FIG. 5A is a schematic diagram illustrating a selectivity characteristic as to a video IF signal of a SAW filter shown in FIG. 4 when a trapping circuit of the SAW filter is off;

FIG. 5B is a schematic diagram illustrating a selectivity characteristic as to an audio IF signal of the SAW filter shown in FIG. 4;

FIG. 5C is a schematic diagram illustrating a selectivity characteristic as to the video IF signal of the SAW filter shown in FIG. 4 when the trapping circuit of the SAW filter is on;

FIG. 6A is a schematic diagram illustrating a frequency arrangement or spectrum of RF signals at an input side of a tuner shown in FIG. 4; and FIG. 6B is a schematic diagram illustrating a frequency arrangement or spectrum of RF signals at an output side of a tuner shown in FIG. 4.

DETAILED DESCRIPTION OF THE PREFERRED EMBODIMENT

A receiver for receiving television broadcasts according to an embodiment will now be described with reference to FIGS. 4 to 6B.

Figure 2:
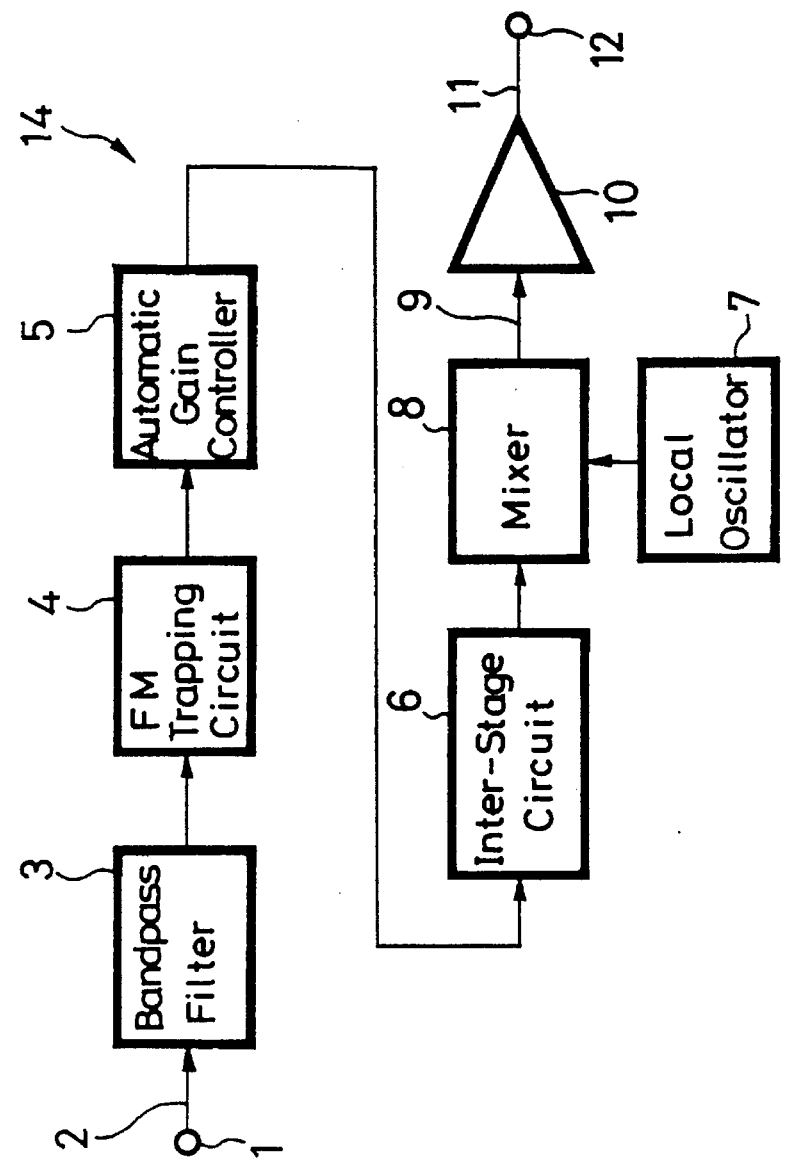
FIG. 2 is a block diagram illustrating an example of a conventional tuner for a television receiver.
Figure 3:
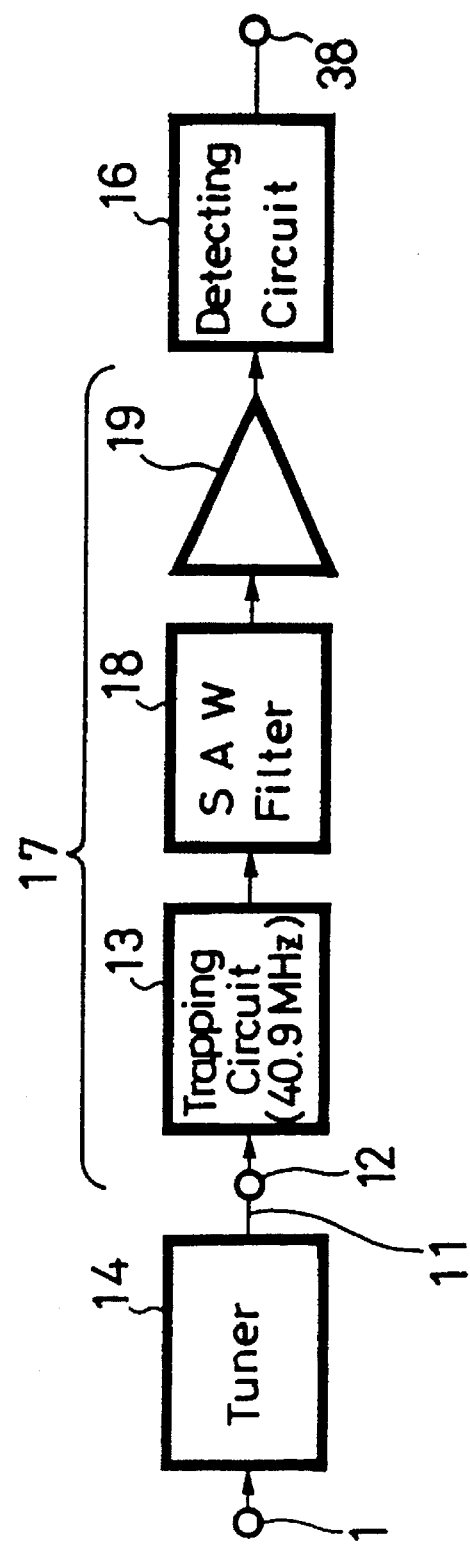
FIG. 3 is a block diagram illustrating an example of a conventional television receiver.
Figure 4:
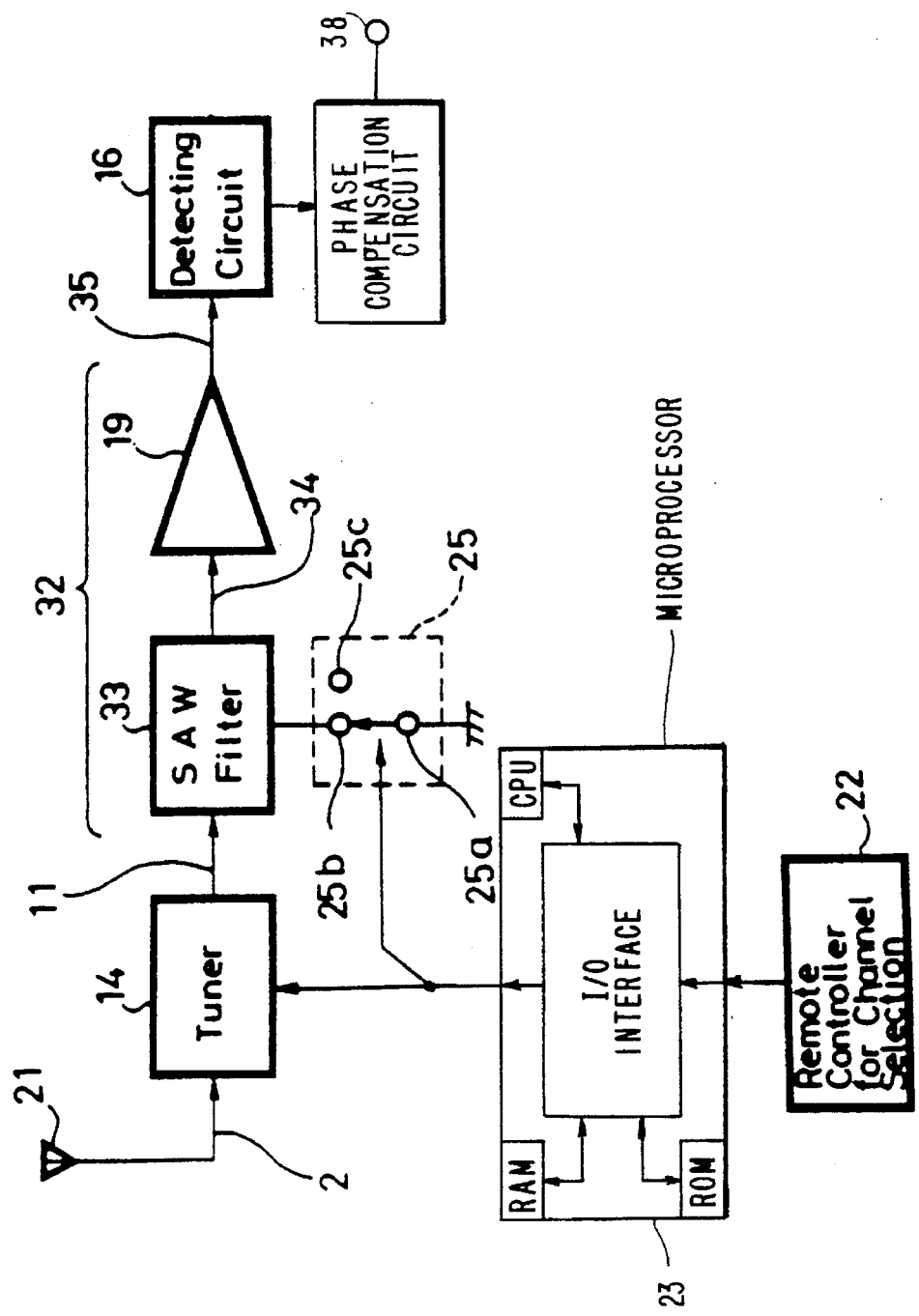
FIG. 4 is a block diagram illustrating an arrangement of a television receiver according to an embodiment of the present invention.

FIG. 4 of the accompanying drawings shows in block form an arrangement of a television receiver according to the embodiment of the present invention. In FIG. 4, like parts corresponding to FIGS. 2 and 3 are marked with the same reference and therefore need not be described in detail.

Figure 1A:
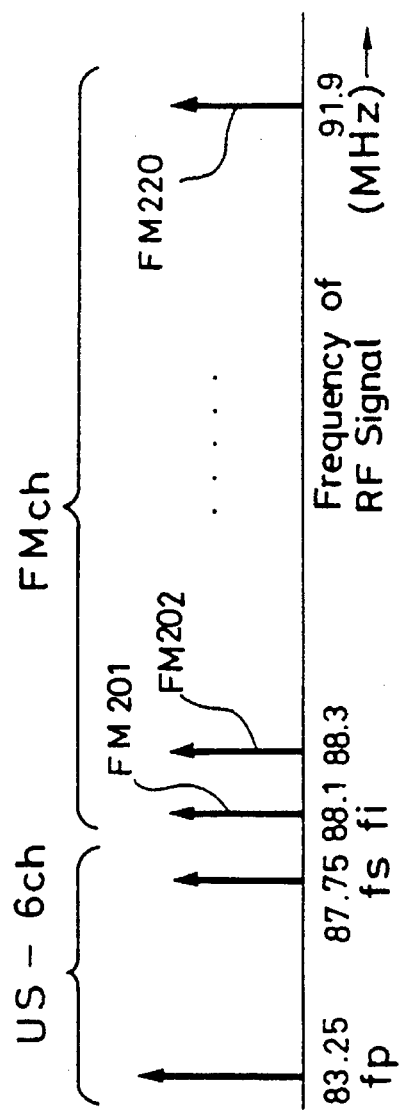
FIG. 1A shows a schematic diagram illustrating a frequency arrangement or spectrum of RF signals in the U.S.A.

Referring to FIG. 4, the RF signal 2 received by an antenna 21 is supplied to a tuner 14. The received RF signal 2 includes an RF signal of television broadcasts and an RF signal of FM broadcasts some of which interfere with the RF signal of the television broadcast. The frequency arrangement or spectrum of these RF signals in the U.S.A. are shown in FIG. 1A. The tuner 14 has the same construction as that of FIG. 2.

The tuner 14 is an electronic control type tuner and a tuned frequency thereof is changed in accordance with a control signal from a microprocessor 23. The control signal corresponds to a broadcast channel selected by a remote controller 22 for channel selection. The microprocessor 23 includes a central processing unit (CPU), a read only memory (ROM), a random access memory (RAM), and an input/output (I/O) interface or the like. An operation program is stored in the ROM. Under the control of the operation program, the microprocessor 23 controls a change-over switch 25 in a manner that a movable contact 25a of the switch 25 is connected to a fixed contact 25b only when the US-6ch is selected by the remote controller 22, while the movable contact 25a is connected to a fixed contact 25c when a television channel other than the US-6ch is selected by the remote controller 22.

An IF signal 11 selected by the tuner 14 is applied to an input electrode of the SAW filter 33. The SAW filter 33 also serves as a trapping circuit and constitutes an IF circuit 32 together with an IF amplifier 19. The SAW filter 33 is provided with an output electrode for a video IF signal and another output electrode for an audio IF signal. FIG. 5A shows a schematic diagram illustrating a selectivity characteristic curve 36 as to the video IF signal of the SAW filter 33 when the trapping circuit of the SAW filter 33 is in an off-state. FIG. 5B shows a schematic diagram illustrating a selectivity characteristic curve 37 as to the audio IF signal of the SAW filter 33. As is clear from FIG. 5A, the selectivity characteristic curve 36 as to the video IF signal has a wide pass band.

The SAW filter 33 is provided with a trapping electrode connected to the fixed contact 25b of the switch 25. A trapping frequency of the trapping circuit is selected to 40.9 MHz by the following reason. Namely, among the RF signals of the FM broadcasts serving as interfering or crosstalk signals for the RF signals of the television broadcasts, the RF signal of the FM 201-ch adjacent to the RF signal of the US-6ch serves as an interfering signal for the US-6ch. Then, the frequency fi' of the IF signal of this FM 201-ch is 40.9 MHz. In this regard, as shown in FIG. 1A, the frequencies fp and fs of the video RF signal and the audio RF signal of the US-6ch are 83.25 MHz and 87.75 MHz, respectively, and the frequency of the RF signal of this FM-201ch adjacent to the RF signal of the US-6ch is 88.1 MHz. Now, IF frequencies fp' and fs' of the video IF signal and the audio IF signal included in the IF signal 11 are 45.75 MHz and 41.25 MHz, respectively.

An IF signal 34 from the SAW filter 33 is amplified by the IF amplifier 19 and then applied to a detecting circuit 16 of the intercarrier system as an IF signal 35. The video and audio signals from the detecting circuit 16 appear at an output terminal 38.

Operation of this embodiment shown in FIG. 4 will be described in detail.

When the US-6ch is selected by the remote controller 22 for channel selection, the microprocessor 23 delivers a control signal to the change-over switch 25 so that the movable contact 25a of the switch 25 is connected to the fixed contact 25b and the tuned frequency of the tuner 14 is set to the RF signal of the US-6ch.

Figure 1B:
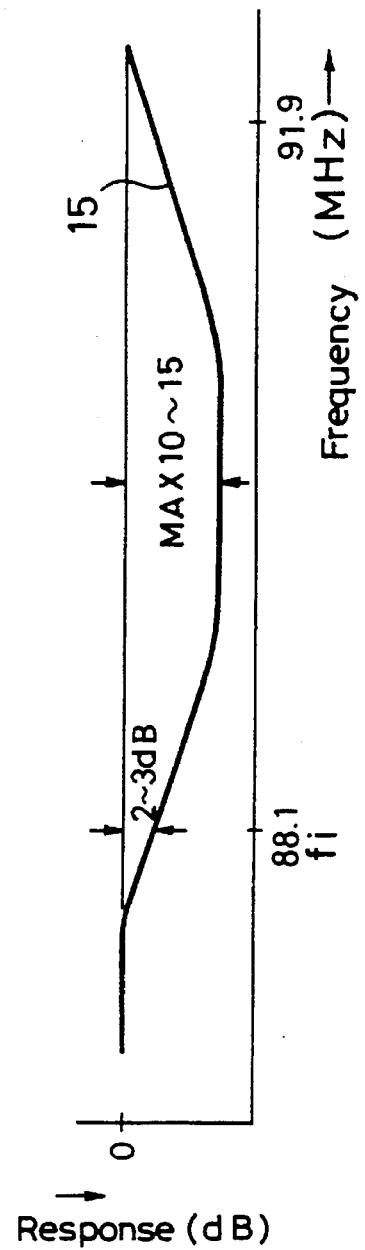
FIG. 1B shows a schematic diagram illustrating a FM trapping or selectivity characteristic of an FM trapping circuit in FIG. 2.

FIG. 6A shows a schematic diagram of a frequency allocation or spectrum of the RF signals in the vicinity of the US-6ch supplied at an input side of the tuner 14. As is clear from FIG. 6A, the RF signal of the FM-201ch is adjacent to the RF signal of the US-6ch. In this regard, the frequencies fp and fs of the video RF signal and the audio RF signal of the US-6ch are 83.25 MHz and 87.75 MHz, respectively, and the frequency fi of the RF signal of the FM-201ch is 88.1 MHz. Thus, as shown in FIG. 6B, at the output side of the tuner 14, there appear a video IF signal with a video IF frequency fp' of 45.75 MHz, an audio IF signal with an audio IF frequency fs' of 41.25 MHz, and an interfering signal with a frequency fi' of 40.9 MHz. As clear from the presence of this interfering signal with the frequency fi' of 40.9 MHz, the FM trapping circuit 4 (see FIG. 2) of the FM tuner 14 does not sufficiently perform the trapping function as to the RF signal of the FM-201ch (see FIG. 1B).

In this case, since the trapping electrode of the SAW filter 33 is grounded through the switch 25 to place the trapping circuit in an on state, the interfering signal with the frequency fi' of 40.9 MHz is trapped by the SAW filter 33. Thus, the selectivity characteristic as to the video IF signal of the SAW filter 33 will be represented by a characteristic curve 40 shown in FIG. 5C, wherein the interference signal of 40.9 MHz is sufficiently attenuated. The pass band of the SAW filter 33 in this state is narrower than that of the SAW filter 33 in the off state of the trapping circuit as clear from the characteristic curve 36 shown by a broken line in FIG. 5C. This characteristic curve 36 in FIG. 5C is same as the characteristic curve 36 in FIG. 5A.

Then, to the IF amplifier 19 and the detecting circuit 16, there are applied the IF signals 34 and 35 of the video and audio IF signals of the US-6ch from which the interfering signal due to the RF signal of the FM-201ch is eliminated, respectively. Thus, the video and audio signals of the US-6ch having no interfering or crosstalk signal can be obtained from the detecting output terminal 38.

When the television broadcast channel other than the US-6ch is selected by the remote controller 22 for channel selection, the movable contact 25a of the switch 25 is connected to the fixed contact 25c. Then, the trapping electrode of the SAW filter 33 is opened, so that the trapping circuit of the SAW filter 33 is placed in an off state. In this case, however, since the interfering signal due to the RF signal of the FM broadcast does not appear in the IF signal 11 delivered from the tuner 14, the interfering signal also does not appear in both the IF signal 34 applied to the IF amplifier 19 and the IF signal 35 applied to the detecting circuit 16. Now, when the television broadcast channel other than the US-6ch is selected, the selectivity characteristic of the SAW filter 33 will be that with a wide pass band as shown in FIG. 5A, so that the detection in a wide band can be performed.

As described above, in accordance with the thus constructed embodiment, the trapping circuit of the SAW filter 33 is placed in an on-state only when the US-6ch is selected, so that it is possible to eliminate the interfering or crosstalk signal which is caused by converting the RF signal of the FM-201ch by the tuner 14. Further, the trapping circuit of the SAW filter 33 is placed in an off-state when the broadcast channel other than the US-6ch is selected, so that it is possible to perform a wide band detection.

While in the above-described embodiment the trapping circuit is formed in the SAW filter 33, there may be provided at the input side of the SAW filter 33 with a trapping circuit constituted by an LC circuit which becomes in an on-state only when the US-6ch is selected. In this case, in parallel to the LC circuit, there is provided with an electronic switch which is turned on only when the US-6ch is selected. Further, in this case, a phase compensation circuit is provided at the output side of the detecting circuit 16.

Further, while in the above-described embodiment the present invention is applied to a television receiver used in the United States, the present invention is not limited thereto and may be applied to a television receiver for receiving television broadcasts having the similar frequency spectrum to that of FIG. 1A, achieving the same or similar advantages of the present invention.

As set out above, according to this invention, since the trapping circuit is formed in the IF circuit so as to trap an interfering signal which is formed by converting, by the tuner, an RF signal of an FM broadcast whose frequency is adjacent to that of an RF signal of a television broadcast, and the trapping circuit is set in an on-state only when the television broadcast which RF signal frequency is adjacent to the frequency of the RF signal of the FM broadcast is selected, and set in an off-state when a television broadcast other than the television broadcast is selected, it is possible to eliminate the interference or crosstalk of the FM broadcast as to the television broadcast which frequency is adjacent to that of the FM broadcast, and a wide band detection can be performed as to the television broadcasts other than this television broadcast.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A receiver comprising:

a microprocessor including a central processing unit (CPU), a read only memory (ROM), a random access memory (RAM), and an input/output (I/O) interface;

a tuner, having a bandpass filter for very high frequency (VHF) signals, a low quality-factor (Q) frequency modulation (FM) trapping circuit having an attenuation of about 10 to 15 dB at a central band of an FM frequency spectrum and an attenuation of about 2 to 3 dB near the ends of the FM frequency spectrum, and a mixer operatively connected to a local oscillator, for converting a radio frequency (RF) television broadcast signal, including a US-6ch signal corresponding to a 83.25 MHz video signal and an 87.75 MHz audio signal, and a FM broadcast signal, including a 88.1 MHz signal adjacent to the US-6ch signal, supplied thereto into an intermediate frequency (IF) signal including a 45.75 MHz signal, a 41.25 MHz signal, and a 40.9 MHz interfering signal;

a surface acoustic wave (SAW) filter for effectively trapping or removing the 40.9 MHz interfering signal from the IF signal and outputting a filtered IF signal;

an amplifier for amplifying the filtered IF signal output from the SAW filter to produce an amplified IF signal; and a detecting circuit for detecting the amplified IF signal, wherein the SAW filter operates with a wide pass band when in an "off" mode and includes a switch for activating a trapping circuit for trapping the 40.9 MHz interfering signal by narrowing the pass band of the SAW filter when in an "on" mode, the tuner is responsive to a control signal from the microprocessor such that the trapping circuit of the SAW filter is activated to the "on" mode only when US-6ch is selected by a channel selector in communication with the microprocessor and when a channel other than US-6ch is selected the SAW filter operates with the "off" mode, and the RF and FM signals supplied to the tuner encounter the bandpass filter for VHF signals, the low-Q FM trapping circuit having an attenuation of about 10 to 15 dB at a central band of the FM frequency spectrum and an attenuation of about 2 to 3 dB near the ends of the FM frequency spectrum for preventing interference of the RF signal by the FM signal, and the mixer operatively connected to the local oscillator to convert the RF and FM signals to the IF signal.

2. The receiver according to claim 1, wherein a phase compensation circuit is provided at the output side of the detecting circuit and the trapping circuit of the SAW filter is an LC circuit.

* * * * *